United States Patent Office 3,644,367
Patented Feb. 22, 1972

3,644,367
17α-AZA-D-HOMOSTEROID[17,17a-e]TETRAZOLES
George Rosenkranz and Pierre Crabbé, Mexico City, Mexico, assignors to Syntex Corporation, Panama, Republic of Panama
No Drawing. Filed Apr. 30, 1968, Ser. No. 725,536
Int. Cl. C07d 10/00
U.S. Cl. 260—287 R         6 Claims

ABSTRACT OF THE DISCLOSURE 17a-aza-D-homosteroid[17,17a-e]tetrazoles of the estrane and androstane series exhibit estrogenic or anabolic activity.

The present invention relates to novel pentacyclic steroid tetrazoles and to processes for their preparation.

In particular, the present invention is directed to 17a-aza-D-homoestrano[17,17a-e]tetrazoles, 17a-aza-D-homoandrostano[17,17a-e]tetrazoles, derivatives thereof, and processes for their preparation.

The present novel 17a-aza-D-homosteroid[17,17a-e] tetrazoles can be illustrated by the following formulas:

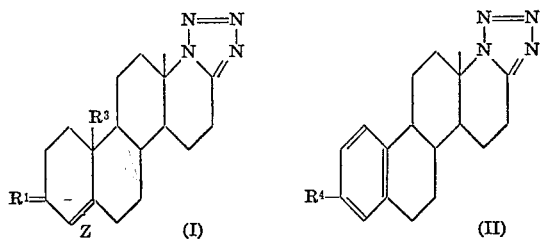

wherein
$R^1$ is O= or the group

in which
$R^2$ is hydrogen, hydroxy, alkoxy, tetrahydrofuran-2'-yloxy, tetrahydropyran-2'-yloxy, or a conventional hydrolyzable ester;
$R^3$ is hydrogen or methyl;
$R^4$ is hydroxy, alkoxy, tetrahydrofuran-2'-yloxy, tetrahydropyran-2'-yloxy, or a conventional hydrolyzable ester; and
Z is a carbon-carbon single bond or a carbon-carbon double bond.

The present novel compounds of Formula I wherein $R^3$ is methyl are 17a - aza - D-homoandrostano[17,17a-e] tetrazole derivatives. The novel compounds of Formula I wherein $R^3$ is hydrogen are 17a - aza - D - homoestrano-[17,17a-e]tetrazole derivatives. The new steroids of Formula II are 17a - aza - D - homoestra - 1,3,5(10) - trieno-[17,17a-e]tetrazole derivatives.

By the term "alkoxy" is meant alkyl ethers of from 1 to 8 carbon atoms. These alkyl ethers can be straight chain, branch chain or cyclic alkyl ethers. Accordingly, alkoxy includes methoxy, ethoxy, propoxy, isopropoxy, butoxy, hexoxy, 2-pentoxy, cyclopentoxy, cyclohexoxy, and the like.

The term "conventional hydrolyzable ester" as used herein denotes those hydrolyzable ester groups conventionally employed in the steroid art, preferably those derived from hydrocarbon carboxylic acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branch chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecenoate, phenoxyacetate, benzoate, phenylacetate diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi - β,β - dimethylglutarate, acetoxyacetate, 2-chloro-4-nitrobenzoate, aminoacetate, diethylaminoacetate, piperidinoacetate, β-chloropropionate, trichloroacetate, β-chlorobutyrate, and the like.

The present novel steroids of Formula I, wherein $R^3$ is methyl, exhibit anabolic activity and have a high anabolic to androgenic activity ratio. Accordingly, the present compounds are useful for the treatment of chronic underweight, post-operative conditions, debilitating conditions, and the like. These novel steroids are administered by the usual pharmaceutically acceptable routes, such as orally, at dosages of from about 0.01 mg. to about 1.0 mg. per kilogram of body weight of the animal subject.

The present novel steroids of Formula I, wherein $R^3$ is hydrogen, and Formula II, exhibit estrogenic activity and accordingly are useful in fertility control and for the treatment of amenorrhea, osteoporosis and like conditions. These novel steroids are administered in the usual pharmaceutically acceptable routes, such as orally, at dosages of from about 0.01 mg. to about 1.0 mg. per kilogram of body weight of the animal subject.

The present compounds are administered as solids in the form of pills, pellets, powders, capsules, and the like, or as liquids in the form of solutions (aqueous or non-aqueous), syrups, suspensions, and the like.

The 17a - aza-D-homosteroids[17,17a-e]tetrazoles, the present novel compounds of Formulas I and II, are prepared from the corresponding starting 17-ketoxime steroids by means of the present novel process, which can be illustrated by the following reaction sequence:

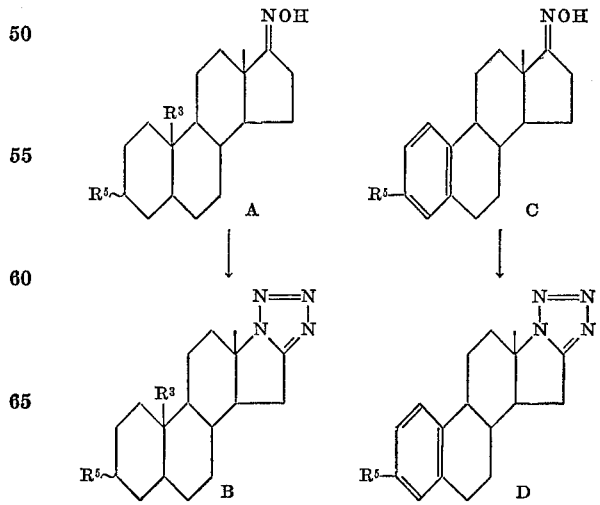

wherein $R^3$ is hydrogen or methyl; and $R^5$ is alkoxy or a conventional hydrolyzable ester.

The 17a-aza - D - homo-estrano[17,17a-e]tetrazole and 17a-aza - D - homo-androstano[17,17a-e]tetrazole derivatives of the compounds of Formula B are prepared from the corresponding estrane-17-one oxime and androstane-17-one oxime derivatives, the compounds of Formula A. The 17a-aza - D - homoestra-1,3,5(10)-triene[17,17a-e] tetrazole derivatives, the compounds of Formula D, are prepared from the corresponding estra-1,3,5(10)-triene-17-one oxime derivatives, the compounds of Formula C.

According to the present novel process, the compounds of Formulas B and D are prepared by treating the starting 17-ketoxime steroids, the corresponding compounds of Formulas A and C, with hydrazoic acid in an inert, nonaqueous, organic solvent. The reaction is carried out at temperatures between 10° C. and 50° C., preferably at about room temperature. At least one molar equivalent of hydrazoic acid is used per molar equivalent of 17-ketoxime starting steroid. Preferably, two or more molar equivalents of hydrazoic acid are used. Typical inert, organic solvents that are used in the present novel process include hydrocarbons, such as benzene, toluene, cyclohexane, hexane, iso-octane, and the like; and halogenated hydrocarbons, such as methylene chloride, chloroform, dichloroethane, and the like.

The product steroid tetrazole is isolated by conventional techniques. For example, the reaction mixture is diluted with water, extracted with a water-immiscible inert, organic solvent, and chromatographed.

The hydrazoic acid is prepared by treating an azide salt with at least one H+ equivalent of a strong acid, such as sulfuric acid, chlorosulfonic acid, or the like. Preferably, two or more H+ equivalents of a strong acid are employed. The reaction is conducted in an inert, organic solvent; typical inert, organic solvents include hydrocarbons, such as benzene, hexane, and the like; and halogenated hydrocarbons, such as chloroform, ethylene chloride, trichloroethane, and the like. Optionally, the reaction is conducted under an inert gas atmosphere, such as under a nitrogen gas atmosphere. Typical azide salts employed include lithium azide, sodium azide, potassium azide, calcium azide, lead azide, silver azide, ammonia azide, and the like; sodium azide is the preferred azide salt.

In the preferred embodiment of the present invention, the hydrazoic acid is prepared in situ prior to the introduction of the 17-oximino steroid.

The starting 17-ketoxime steroids that can be employed in the present novel process are not limited to those compounds of Formulas A and C. 17-ketoxime steroids substituted at other positions can also be employed. For example, steroids substituted at positions C–1, 2, 3, 4, 5, 6, 7, 9, 11, 12, 14, 15, 16, 18 and/or 19 with amino, fluoro, chloro, bromo, hydroxy, alkoxy, conventional hydrolyzable esters, alkyl, methylene groups and the like can also be employed. Moreover, the steroid can be substituted with methylene groups bridging positions C–1,2, C–6,7, C–15,16, and the like. Groups that are attacked by hydrazoic acid obviously cannot be present on the steroid nucleus. Accordingly, the steroid cannot be substituted with keto groups, carboxylic groups, carbonyl groups, nitrile groups, and the like.

The novel compounds of Formula B are subjected to further chemical processes to obtain the novel compounds of Formula I. For example, the compounds of Formula B can be hydrolyzed via conventional hydrolysis means to obtain the 3-hydroxy derivatives. These hydroxy derivatives can be etherified by conventional techniques, such as by treatment with alkali metal hydride and an alkyl halide, 2-dihydrofuranyl halide or 2-dihydropyranyl halide. The hydroxy derivatives can be selectively oxidized by treatment with 8 N chromic acid in acetone or chromium trioxide in glacial acetic acid to afford the corresponding 3-keto derivatives. The $\Delta^4$-3-keto derivatives are prepared from the corresponding 3-keto derivatives by conventional techniques; such as by selectively brominating the 3-keto derivative at positions C–2 and C–4, and then selectively debrominating the resulting 3-keto-2,4-dibromo derivative at the C–2 position with a molar equivalent of chromous acetate and then dehydrobrominating with a carbonate salt. The thus obtained $\Delta^4$-3-keto derivative can be selectively reduced with lithium aluminum hydride in tetrahydrofuran to obtain the corresponding 3$\beta$-hydroxy-$\Delta^4$ derivative. The thus obtained hydroxy derivative can be etherified by the aforementioned processes or they can be esterified by conventional methods; for example, by treatment with the acid anhydrides of hydrocarbon carboxylic acids in the presence of an acid catalyst.

The novel compounds of Formula D are subjected to further chemical transformations to afford the novel compounds of Formula II. For example, the novel compounds of Formula D in which $R^5$ is alkoxy can be hydrolyzed by conventional methods, such as by refluxing in an aqueous 48% hydrogen bromide acetic acid solution to afford the corresponding 3-hydroxy derivative. The latter can be etherified as described above, or esterified by treatment with an acid chloride of a hydrocarbon carboxylic acid, or with an acid anhydride of a hydrocarbon carboxylic acid in the presence of an acid catalyst.

The following examples are included to further illustrate the present invention and are not limitations of the claimed invention.

PREPARATION 1

A solution of 2 g. of 5$\alpha$-androstan-17-one in 75 ml. ethanol was refluxed for 2 hours with a mixture of 0.9 g. hydroxylamine-hydrochloride, 1.07 g. sodium acetate and 28 ml. ethanol.

Evaporation of the solvent and extraction with ethyl acetate yields 5$\alpha$-androstan-17-one oxime. The product is recrystallized from acetone.

Similarly, 3$\beta$-acetoxy-5$\alpha$-androstan-17-one oxime and 3-methoxyestra-1,3,5(10)-trien - 17 - one oxime are prepared from the corresponding 17-keto steroids.

EXAMPLE 1

To 585 mg. of sodium azide suspended in 10 ml. ethylene chloride, 2.7 ml. of chlorosulfonic acid are slowly added. The mixture is stirred for one hour and then an additional 585 mg. of sodium azide are added. After 15 minutes a solution of 1.5 g. of 5$\alpha$-androstan-17-one oxime in 20 ml. ethylene chloride is slowly added and the reaction mixture is stirred at room temperature for two hours. The reaction mixture is diluted with water and extracted with ethyl acetate; the combined extracts are evaporated and the residue is chromatographed over 150 g. of chromatographic magnesium silicate (Florisil, 15.5% MgO, 85% SiO$_2$, 0.5% Na$_2$SO$_4$) eluting with a mixture of hexane:ethyl acetate (8:2). The fraction containing 17a-aza-D-homo - 5$\alpha$ - androstano[17,17a-e]tetrazole is identified by nuclear magnetic resonance: 0.81 p.p.m. (19–H); 1.36 p.p.m. (18–H). The product is recrystallized from methylene chloride:hexane.

Similarly, 17a - aza-D-homo-5$\alpha$-estrano[17,17a-e]tetrazole is prepared from 5$\alpha$-estran-17-one oxime.

EXAMPLE 2

To a stirred suspension of 6 g. sodium azide in 100 ml. ethylene chloride, 18 ml. of chlorosulfonic acid are added dropwise. After 1 hour an additional 6 g. of sodium azide are added; 16 minutes later a solution of 10 g. of 3$\beta$-acetoxy-5$\alpha$-androstane-17-one oxime in 150 ml. ethylene chloride is slowly added. The reaction mixture is stirred at room temperature for 2 hours and then worked up by addition of water and extracted with methylene chloride. The combined extracts are chromatographed on chromographic magnesium silicate eluting with hexane-ethyl acetate (65:35); the fraction containing 3$\beta$-acetoxy-17a-aza-D-homo - 5$\alpha$ - androstano[17,17a-e]tetrazole is identified by nuclear magnetic resonance: 0.86 p.p.m. 19–H; 1.36 p.p.m. 18–H; 2.0 p.p.m., 3β-acetoxy. The product is recrystallized from methylene chloride-diethyl ether.

By employing 3β-acetoxy-5α-estran-17-one oxime or 3β-methoxy-5-estran - 17 - one oxime as the 17-oximino starting material in the above process, 3β-acetoxy-17a-aza-D-homo-5α-estrano[17,17a-e]tetrazole or 3β-methoxy-3β-methoxy-5α-estran - 17 - one oxime as the 17-oximino is obtained.

EXAMPLE 3

Three grams of 3β-acetoxy-17a-aza-D-homo-5α-androstano[17,17a-e]tetrazole is hydrolyzed in 90 ml. of a 1% potassium hydroxide methanol solution at room temperature. The hydrolysis is conducted under a nitrogen atmosphere for 18 hours. The reaction mixture is extracted with methylene chloride after being diluted with 150 ml. of water. The extracts are combined, neutralized by the addition of dilute hydrochloric acid, washed with water, filtered, dried over sodium sulfate, filtered and evaporated to give 3β-hydroxy - 17a - aza - D - homo-5α-androstano[17,17a-e]tetrazole.

Likewise, 3β - hydroxy-17a-aza-D-homo-5α-estrano[17,17a-e]tetrazole is prepared from 3β-acetoxy-17a-aza-D-homo - 5α - estrano[17,17a-e]tetrazole via the above hydrolysis.

EXAMPLE 4

To a cooled mixture (8° C.) of 3 g. of 3β-hydroxy-17a-aza-D-homo - 5α - androstano[17,17a-e]tetrazole and 200 ml. of acetone, 3 ml. of 8 N chromic acid are slowly added with stirring. After the addition, the resulting reaction mixture is stirred for an additional 45 minutes; then an excess of aqueous sodium bisulfite is added. The resulting mixture is extracted with methylene chloride; the extracts are combined, washed to neutrality, dried over sodium sulfate, filtered and evaporated to afford 3-oxo-17a-aza-D-homo-5α-androstano[17,17a - e]tetrazole. The product is recrystallized from methylene chloride:hexane.

Similarly, 3-oxo-17a-aza-D-homo-5α-estrano[17,17a-e]tetrazole is prepared from 3β-hydroxy-17a-aza-D-homo-5α-estrano[17,17a-e]tetrazole by means of the above selective oxidation process.

EXAMPLE 5

A solution of 2 g. of 3-oxo-17a-aza-D-homoandrost-4-eno[17,17a-e]tetrazole in 75 ml. acetic acid is treated dropwise with 1.92 g. of bromine in 6.2 ml. acetic acid. Three drops of a saturated solution of hydrogen bromide in acetic acid are added and the mixture stirred for 18 hours. The reaction mixture is then poured into water; the resulting precipitated solid is extracted with methylene chloride. The combined extracts are washed to neutrality, dried and evaporated in vacuo, to yield 2,4-dibromo-3-oxo-17a-aza - D-homoandrostano[17,17a-e]tetrazole. The 2,4-dibromo product is added to a solution of 75 ml. of acetic acid and 18 ml. of chloroform. The resulting mixture is added to 5.3 g. of powdered chromous acetate under a carbon dioxide atmosphere. The resulting mixture is stirred for 10 minutes, then air is bubbled through the flask to oxidize the excess of chromous acetate. The mixture is then poured into cold water, extracted with methylene chloride, washed several times with water, dried and evaporated in vacuo. The resulting residue is dissolved in 6 ml. dimethyl acetamide and added to a boiling suspension of 0.8 g. of calcium carbonate in 18 ml. dimethyl acetamide under a stream of nitrogen. After 30 minutes the mixture is cooled, poured into water and extracted with methylene chloride, then washed with a 2% solution of hydrochloric acid and finally with water to neutrality. The residue is purified by preparative thin-layer chromatography to yield 3-oxo-17a-aza-D-homoandrost-4-eno[17,17a-e]tetrazole.

Similarly, 3 - oxo-17a-aza-D-homoestr-4-eno[17,17a-e]-tetrazole is prepared from 3-oxo-17a-aza-D-homo-5α-estrano[17,17a-e]tetrazole via the above selective dehydrogenation process.

EXAMPLE 6

A solution of 1 g. of 3-oxo-17a-aza-D-homoandrost-4-eno[17,17a-e]tetrazole in 50 ml. of tetrahydrofuran is added over a 30 minute period to a stirred suspension of 1 g. lithium aluminum hydride in 50 ml. of anhydrous tetrahydrofuran and this mixture is heated at reflux for 2 hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β-hydroxy-17a-aza-D-homoandrost-4-eno[17,17a-e]tetrazole which may be further purified through recrystallization from acetone: hexane.

Similarly, 3β - hydroxy-17a-aza-D-homoestr-4-eno[17,17a-e]tetrazole is prepared from 3-oxo-17a-aza-D-homoestr-4-eno[17,17a-e]tetrazole by means of the above selective reduction process.

EXAMPLE 7

A solution of 32.6 g. of 3β-hydroxy-17a-aza-D-homoandrostan-4-eno[17,17a-e]tetrazole in 30 ml. of benzene is heated to reflux and about 2 ml. removed by distillation to eliminate moisture. The mixture is cooled to room temperature and 4.8 g. of sodium hydride are added, followed by the dropwise addition of 19.0 g. of methyl bromide in 10 ml. of benzene over a period of 20 minutes. The mixture is allowed to reflux for 20 hours after which time the precipitate of sodium bromide is removed by filtration and the organic phase dried and evaporated to yield 3β - methoxy-17a-aza-D-homoandrostano-4-eno[17,17a-e]tetrazole which is further purified upon recrystallization from pentane.

By employing ethyl bromide, isopropyl bromide and cyclopentyl bromide in place of methyl bromide in the above etherification process the following compounds are respectively obtained:

3β-ethoxy-17a-aza-D-homoandrostan-4-eno[17,17a-e]-tetrazole,
3β-isopropoxy-17a-aza-D-homoandrostan-4-eno[17,17a-e]tetrazole, and
3β-cyclopentoxy-17a-aza-D-homoandrostan-4-eno[17,17a-e]tetrazole.

3β-methoxy-17a-aza-D-homoestr - 4 - eno[17,17a-e]tetrazole is prepared by employing 3β-hydroxy-17a-aza-D-homoestr-4-eno[17,17a-e]tetrazole in the above process.

EXAMPLE 8

Two milliliters of dihydropyran are added to a solution of 1 g. of 3β-hydroxy-17a-aza-D-homoestr-4-eno[17a17a-e]tetrazole in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3β-tetrahydropyran-2'-yloxy-17a-aza-D-homoestr-4-eno[17,17a-e]tetrazole which is recrystallized from pentane.

3β - tetrahydrofuran - 2' - yloxy-17a-aza-D-homoestr-4-eno[17,17a-e]tetrazole is obtained by employing dihydrofuran in place of dihydropyran in the above process.

EXAMPLE 9

A mixture of 1 g. of 3β-hydroxy-17a-aza-D-homoestr-4-eno[17,17a-e]tetrazole, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-17a-aza-D-homoestr-4-eno[17,17a-e]tetrazole which may be further purified through recrystallization from acetone:hexane.

3β-benzoyloxy - 17a - aza-D-homoestr-4-eno[17,17a-e]- tetrazole is obtained by employing benzoyl chloride in place of acetic anhydride in the above process.

EXAMPLE 10

A mixture of 1 g. 3-oxo17a-aza-D-homoestr-4-eno-[17,17a-e]tetrazole, 2 g. of hydrazine hydrate, 1.2 g. of potassium hydroxide, 1.2 ml. of water and 1.2 ml. of diethylene glycol is heated for 45 minutes at reflux, then in an open flask until the temperature of the reaction mixture is 200° C., and finally for an additional 2 hours at reflux. The mixture is cooled, water added and the product isolated by extraction with ether. These extracts are dried over sodium sulfate and evaporated to yield 17a-aza-D-homoestr-4-eno[17,17a-e]tetrazole which may be further purified through recrystallization from acetone:hexane.

EXAMPLE 11

To a suspension of 6 g. of sodium azide and 100 ml. ethylene chloride 13 ml. chlorosulfonic acid is added dropwise with stirring. After 1 hour an additional 6 g. of sodium azide was added, and 15 minutes later, a solution of 10 g. of 3-methoxyestra-1,3,5(10)-trien-17-one oxime is added slowly. The mixture is stirred for 2 hours and then poured into water; the product is extracted with methylene chloride. The combined extracts are washed to neutrality with water, dried, filtered and chromatographed on chromatographic magnesium silicate.

Elution with a gradient (95:5–7:3) hexene:ethyl acetate mixture yielded a fraction [identified by NMR 1.4 p.p.m. (18–H), 3.75 p.p.m. (3—OCH$_3$); 6.6 p.p.m. (4–H), 6.8 p.p.m. (2–H); 7.1–7.3 p.p.m., (1–H, doublet: $J_H$=8 c.p.s.)] containing 3-methoxy-17a-aza-D-homoestra-1,3,5(10)-trieno[17,17a-e]-tetrazole. After the fraction is evaporated, the product is recrystallized from methylene chloride:ether.

Similarly, 3-acetoxy-17a-azo-D-homoestra-1,3,5(10)-trieno-[17,17a-e]tetrazole,
3-tetrahydropyran-2'-yloxy-17a-aza-D-homoestra-1,3,5(10)-trieno[17,17a-e]tetrazole,
3-cyclopentoxy-17a-aza-D-homoestra-1,3,5(10)-trieno-[17,17a-e]-tetrazole and
3-propoxy-17a-aza-D-homoandrosta-1,3,5(10)-trieno-[17,17a-e]tetrazole are prepared from the corresponding 17-ketoxime steroids.

EXAMPLE 12

A mixture of 3.24 g. of 3-methoxy-17a-aza-D-homoestra-1,3,5(10)-trieno[17,17a-e]tetrazole, 50 ml. of aqueous 48% hydrogen bromide, and 50 ml. acetic acid is refluxed for 30 minutes. The cooled mixture is then neutralized by the addition of aqueous 5% sodium carbonate and extracted with methylene chloride. The combined extracts are washed with water, dried over sodium sulfate and evaporated to yield 3-hydroxy-17a-aza-D-homoestra-1,3,5(10)-trieno[17,17a-e]tetrazole.

EXAMPLE 13

A solution of 1 g. of 3-acetoxy-17a-aza-D-homoestra-1,3,5(10)-trieno[17,17a-e]tetrazole in 50 ml. of methanol is heated at reflux for 3 hours with a solution of potassium hydroxide in 1 ml. of water. The reaction mixture is then poured into ice water and the solid which forms is collected by filtration, washed with water to neutrality and dried to yield 3-hydroxy-17a-aza-D-homoestra-1,3,5(10)-trieno[17,17a-e]tetrazole which is recrystallized from methylene chloride:ether.

What is claimed is:
1. A compound selected from the group having the formula:

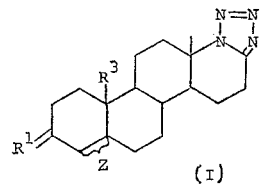

wherein R$^1$ is the group O= or

R$^2$—H in which R$^2$ is hydrogen, hydroxy, alkoxy having from 1 to 8 carbon atoms, tetrahydrofuran-2'-yloxy, or tetrahydropyran-2'-yloxy; R$^3$ is methyl; and Z is a carbon-carbon single bond or a carbon-carbon double bond.

2. A compound selected from the group having the formula:

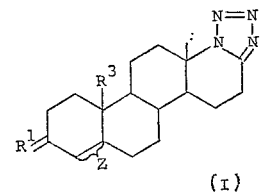

wherein R$^1$ is the group O= or

R$^2$—H in which R$^2$ is hydroxy, methoxy, tetrahydrofuran-2'-yloxy, tetrahydropyran-2'-yloxy, or acetoxy; R$^3$ is methyl; and Z is a carbon-carbon double bond.

3. The compound of Formula I according to claim 2 which is 3β-hydroxy-17a-azo - D - homoandrost-4-eno-[17,17a-e]tetrazole.

4. The compound of Formula I according to claim 2 which is 3β-methoxy-17a-aza - D - homoandrost-4-eno-[17,17a-e]tetrazole.

5. The compound of Formula I according to claim 2 which is 3β-acetoxy-17a-aza - D - homoandrost-4-eno-[17,17a-e]tetrazole.

6. The compound of Formula I according to claim 2 which is 3-oxo-17a-azo - D - homoandrost - 4 - eno-[17,17a-e]tetrazole.

References Cited

UNITED STATES PATENTS

| | | | |
|---|---|---|---|
| 1,599,493 | 9/1926 | Schmidt | 260—308 |
| 3,182,069 | 5/1965 | Mechoulam | 260—308 |
| 3,389,137 | 6/1968 | Mosby | 260—288 X |

FOREIGN PATENTS

| | | |
|---|---|---|
| 123,697 | 7/1967 | Czechoslovakia. |

OTHER REFERENCES

Benson, Chem. Review, vol. 41, pp. 1–61, (partic. p. 48) (1947).

DONALD G. DAUS, Primary Examiner

U.S. Cl. X.R.

260—288 R, 289 AZ, 345.7, 397, 397.3; 424—458